Aug. 3, 1926.

P. L. GEER 1,594,901

ACETYLENE GENERATOR

Filed August 12, 1922

INVENTOR.
Paul L. Geer
BY M. C. Frank
ATTORNEY

Aug. 3, 1926.

P. L. GEER 1,594,901

ACETYLENE GENERATOR

Filed August 12, 1922    3 Sheets-Sheet 2

INVENTOR.
Paul L. Geer
BY M. C. Frank
ATTORNEY

Aug. 3, 1926.  
P. L. GEER  
ACETYLENE GENERATOR  
Filed August 12, 1922

INVENTOR.
Paul L. Geer
BY M. C. Frank
ATTORNEY

Patented Aug. 3, 1926.

1,594,901

UNITED STATES PATENT OFFICE.

PAUL L. GEER, OF OAKLAND, CALIFORNIA.

ACETYLENE GENERATOR.

Application filed August 12, 1922. Serial No. 581,427.

This invention relates to acetylene generators, and more especially to a power unit adapted for attachment to existing as well as future generators, for driving the carbide feeding device thereof.

Among the objects of my invention are to produce a selective-pressure generator, which, having been given its initial start manually, develops the pressure selected and is thereafter automatic until the charge of carbide has been consumed. Further, to produce a generator whose motive power for the carbide feed, is derived from the pressure of the generated gas as it is generated and drawn off or used. Further, to produce a generator that will furnish gas at a substantially constant pressure, by an accurately controlled carbide feed, and thereby dispense with the necessity of pressure regulating valves as are now required in present generators. Other objects of my invention will appear hereinafter as the description of it progresses.

In furtherance of the above and other objects, I construct a generator having a gas generating chamber, and a motor housed within a case, and which latter communicates and connects with said chamber. The operation of the motor is accomplished by the pressure and intermittent interruption of the generated gas flowing to the service outlet through two valves, hereinafter described. Such intermittent interruption while gas is being drawn, causes the balancing and unbalancing of the pressure on the two sides of a motor, which with the aid of a coacting spring develops a reciprocating motion, that by and with the use of levers and ratchet connections causes the carbide-feed shaft to rotate intermittently.

One of the above mentioned valves, (the motor valve) is mechanically connected with the said motor, and provided with means for quick opening when the motor diaphragm approaches its upper limit of travel, and for quick closing when the diaphragm approaches its lower limit or rest position. The other valve determines the generator pressure and is hereinafter termed the equalizing governor valve, the opening and closing of which is controlled by an independent diaphragm and spring. The tension of said spring is variable, and at the will of the operator, who, by the aid of a reference chart attached thereto, may select any desired pressure within the range of the generator.

In addition to the above broader features of the invention, there are certain details of design, whereby compactness, simplicity and durability of structure, as well as positiveness and ease of operation are obtained, and which are shown in the drawings, and the essentials thereof will be set forth hereinafter.

In the accompanying three sheets of drawings, I have illustrated an apparatus for carrying my invention into effect, and in which.

Figures 1, 9:
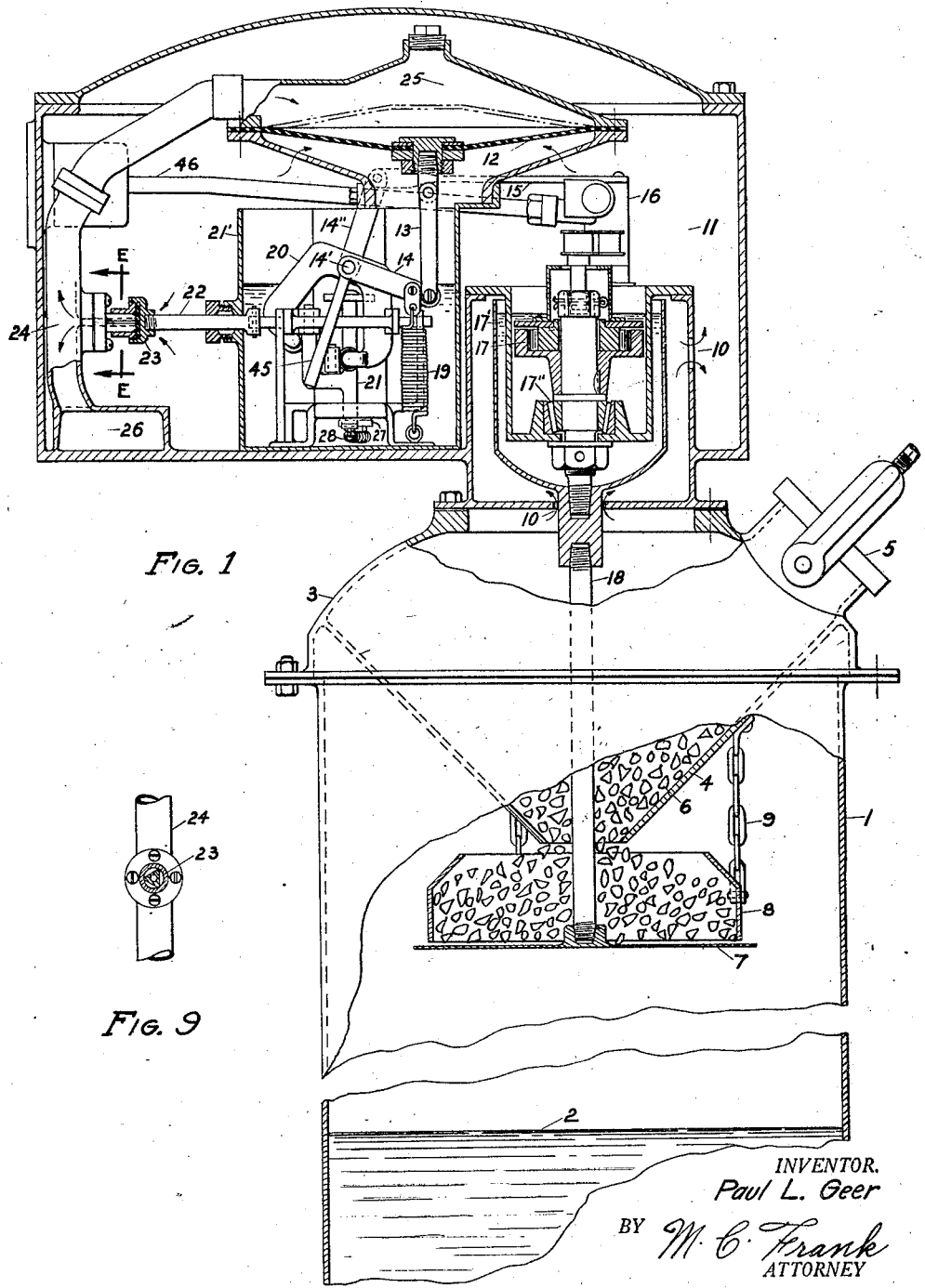
Figure 1 is a partial sectional elevation of it, the section being taken on the line A—A of Figure 2, and shows the generating chamber, the means for feeding the carbide to the water, the motor and motor case, and various contiguous and contributing devices, the near bearing of the motor rocker shaft being removed for clarity of the parts behind it.
Figure 9 is a section on line E—E of Figure 1, and shows the motor valve opening to the service manifold.
Figure 2:
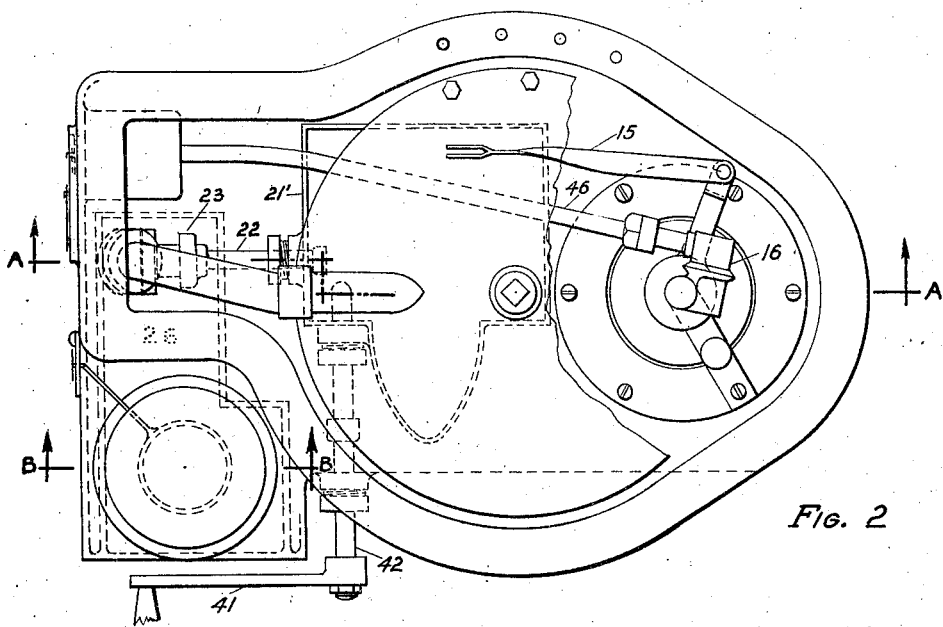
Figure 2 is a plan view, with the cover of the motor case removed and shows some parts interior to the generator.
Figure 3:
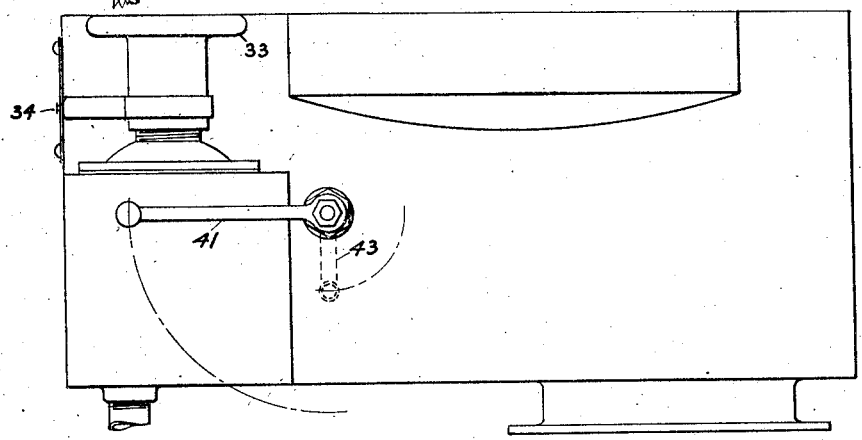
Figure 3 is a side elevation of Figure 2, displaying the manual means for starting gas generation, and the exterior of the equalizing governor control means.
Figure 4:
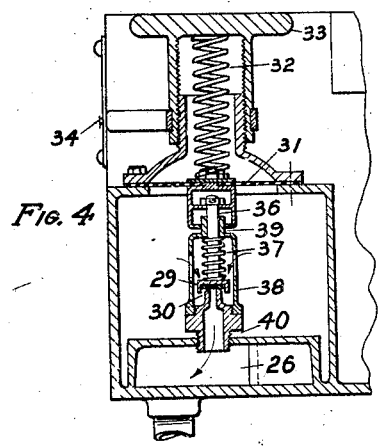
Figure 4 is a cross-section on line B—B of Figure 2, showing the equalizing governor valve in detail.
Figure 5:
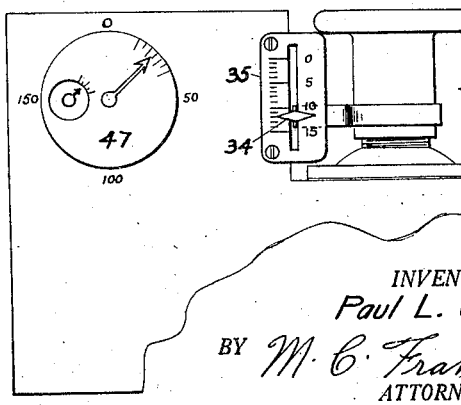
Figure 5 is a fragmentary elevation at right-angles to Figure 3 and shows the carbide meter dials, and the selective-pressure chart.

Referring to the drawings:—A closed chamber 1, the gas generating chamber, is adapted to contain a body of water 2, and is provided with the well known water-filling valve, sludge cock, agitator, etc., not shown.

A cover 3 closes and forms a gas-tight joint with the chamber 1. This cover is provided with a carbide hopper 4, which is filled through a hand hole 5. The carbide is indicated at 6, and drops from the hopper onto a table 7 under the same. Above the table and surrounding the mouth of the hopper, is a floating ring 8 suspended from the hopper as by chains 9. The table 7 is rotated by a shaft 18 secured thereto. By the rotation of the table and the friction of the carbide resting upon it, the ring 8 is oscillated and caused to rise sufficiently from the table to allow pieces of carbide to creep under its edge and fall into the water 2, thereby generating acetylene gas in accordance with well known principles which require no elucidation here. The gas rises and passes through the openings 10 into the motor case 11, which latter has a gas-tight connection at its base with the chamber cover 3.

In the motor case 11, the generated gas exerts pressure on the under side of the diaphragm 12, and raises it to the position shown in dotted lines in Figure 1. This rising of the diaphragm through an attached rod 13, causes an arm 14 made integral with a rocker shaft 14' to turn, transmitting the same angular movement to an arm 14'' also integral with the rocker shaft. The latter arm is connected by a link 15 with an oscillating member 16. This oscillating member by means of a ratchet and pawl device 17, immersed in oil 17' and supported on roller bearing 17'' transmits intermittent, rotary motion to the shaft 18, and the table 7 carrying the carbide. A spring 19, anchored in the motor case and connected to the arm 14, and put in tension by the upward movement of the diaphragm 12, serves to return the diaphragm to its rest position when the pressure on its two sides are in balance.

Figure 6:
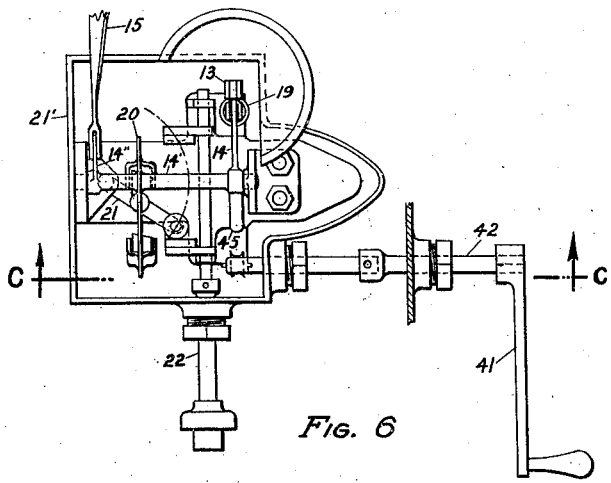
Figure 6 is chiefly a plan of the motor mechanism actuated by the diaphragm, and the means for obtaining the initial pressure manually.
Figure 7:
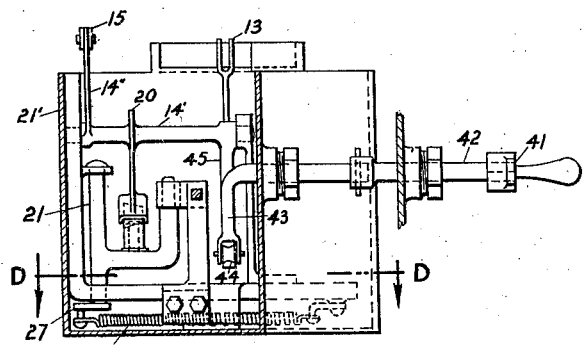
Figure 7 is a partial section on line C—C of Figure 6.
Figure 8:
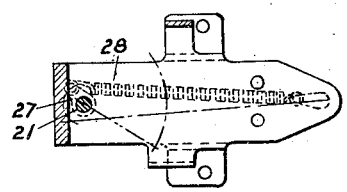
Figure 8 is a section on line D—D of Figure 7, and shows the overbalancing spring which serves to give the decisive and positive action to the motor valve.

Attached to the rocker shaft 14' is a forked yoke 20, whose free ends may be armed with antifriction rollers, as seen in Figure 1. These free ends give oscillation to the pivoted U-shaped swinging arm 21, shown clearly in Figures 6 and 7, which, by means of suitable tappets, reciprocates a rod 22 and actuates a motor valve 23 shown to advantage in Figure 1. The motor valve 23 admits gas from the motor case 11 to a manifold 24, whence it passes to the inclosed chamber 25 above the diaphragm and also to the service chamber 26. The motor valve 23 consists of a stationary triangular nozzle (Figure 9) and a sliding valve having spaces therebetween for the admittance of the generated gas to the said manifold through the nozzle orifice.

To ensure the proper timing and decisive opening and closing of the motor valve 23, I provide the swinging arm 21 at its lower end with a short crank 27, and a coil spring 28. The purpose of this spring is to act as an overbalancer for the said arm 21 when it passes its center of angular movement going in either direction, thereby giving positive action to the motor valve 23.

The motor mechanism is contained and supported within an anchored casing 21' filled with oil and having suitable stuffing-box outlets.

The admission of gas from the motor case 11 to the manifold 24 equalizes the pressure on both sides of the diaphragm 12, and allows the spring 19 to return the diaphragm to its rest position as shown in Figure 1, thereby closing the motor valve 23. As the gas is being consumed in service, a slight drop in pressure in the chamber 25 and service chamber 26, causes another upward movement of the motor diaphragm with its subsequent return to rest position and so on, maintaining the selected pressure determined by the governor. The service chamber 26 through the valve 29 and its assembly which we have termed the equalizing governor valve has gas connection with the motor case 11 at 40. The opening of this valve is determined by the pressure on the smaller diaphragm 31 and by the governor-spring 32. The setting of the tension of this spring is accomplished by manually turning the hand wheel 33, which, in turn, determines the pressure at which the generator will operate. A pointer 34 moving over a calibrated scale 35 indicates when the spring is properly tensed for the pressure selected. The major volume of the gas supply to the service chamber 26, is fed thereto through the governor equalizing valve at the selected pressure. As but a small amount of carbide generates a large volume of gas, the selected pressure is easily maintained; therefore, the motor is but occasionally in operation, and it only functions when the gas from the previously dropped carbide has been drawn off sufficiently for the remaining gas in the generating chamber to drop in pressure below that selected.

As little as a tenth of a pound drop below that of the selected pressure, will close the governor valve, and will cause an upward movement of the diaphragm 12, with its subsequent opening of the motor valve 23 and movement of the carbide table 7, which latter feeds an additional charge of carbide to the water 2, the motor immediately coming to the rest position and remaining inoperative until the gas has been drawn off to the differential pressure point just mentioned.

The equalizing governor valve diaphragm 31 has a considerable area, compared to that of the valve seat 30. Therefore, in order that the full reactive pressure of the governor spring 32 shall not injuriously bear on the valve seat 30, I provide the valve stem 36 with an auxiliary light counter-spring 37, housed within a cage 38 secured to the valve body 40. At the top of the cage is a guide boss 39, forming a shouldered stop and floating connection with the diaphragm assembly. The said shouldered stop is for the purpose of preventing the entire governor counter pressure bearing on the small valve seat 30. Thus, it will be seen that the valve 29 bears comparatively light on the seat 30 because of said shouldered stop and the use of the counter-spring 37 and the floating connection 39.

For the purpose of starting or initiating a pressure in the generator, sufficient for it to be self operating, I provide a crank 41 on an arbor 42, to which is connected a short arm 43 having an antifriction roller 44 on its end, and adapted to register with and contact an arm 45 made integral with the rocker shaft 14'. By manual oscillation of the crank 41 is caused a similar oscillation of the rocker shaft and its arms and connected parts, thus feeding the carbide into the water. After the crank has been oscillated a few times, the apparatus will function automatically, as hereinbefore set forth.

Geared to the oscillating member 16 which is an ordinary speedometer mechanism, is a flexible shaft 46 adapted to be rotated thereby. The shaft is connected to a dial 47 having a graduated scale to show the approximate consumption of carbide, as the amount of carbide fed at each revolution of the table 7 is quite uniform. Thus, by a glance at the dial, the operator may inform himself of the amount of carbide remaining in the hopper.

Having thus illustrated and described my invention in its preferred form for the present, I wish it to be understood that the same may be modified from time to time as practice suggests. Therefore, the patent protection that I desire, is all of that which comes within the spirit and scope of the invention as claimed.

I claim:

1. In an acetylene gas generator, a chamber adapted to receive the gas as generated, a diaphragm therein having mechanism connected to its underside, a service chamber in said chamber adapted to receive the generated gas and direct the same to the top side of said diaphragm, and valve means in connection with said mechanism and operable thereby for the passage of the gas into said service chamber, the said diaphragm operable by the differential of gas pressure on the opposite sides of the diaphragm.

2. In an acetylene gas generator, a diaphragm; rocker shaft in connection therewith, an overbalancing mechanism, and a valve for controlling the admission of generated gas to one side of the said diaphragm, and said valve having an attached rod; means for admitting gas to the other side of the diaphragm the said diaphragm adapted to actuate the said shaft to oscillate the said overbalancing mechanism, causing the latter to reciprocate the said rod to open and close the said valve decisively for the purpose set forth and as substantially described.

3. In an acetylene gas generator, an equalizing valve comprising a movable diaphragm having valve mechanism connected thereto on one side including an auxiliary spring, and on the reverse side a counter-spring, the valve side of the diaphragm operative by the generated gas pressure against the pressure of said counter-spring, and the said auxiliary spring adapted to close the valve when the said counter-pressure spring functions, due to gas consumed with consequent drop of gas pressure.

4. In an acetylene gas generator, a governor equalizing valve comprising a flexible diaphragm having adjustable compression-spring means on one side thereof, and on the other side valve means including a floating connection having a stop, said stop bearing the excess pressure of the said spring means unnecessary to the effective closing of the valve, the valve side of the diaphragm being operative by the pressure of the generated gas when in excess of the selected pressure exerted by the said compression spring.

In testimony whereof, I affix my signature.

PAUL L. GEER.